United States Patent Office 3,463,516
Patented Aug. 26, 1969

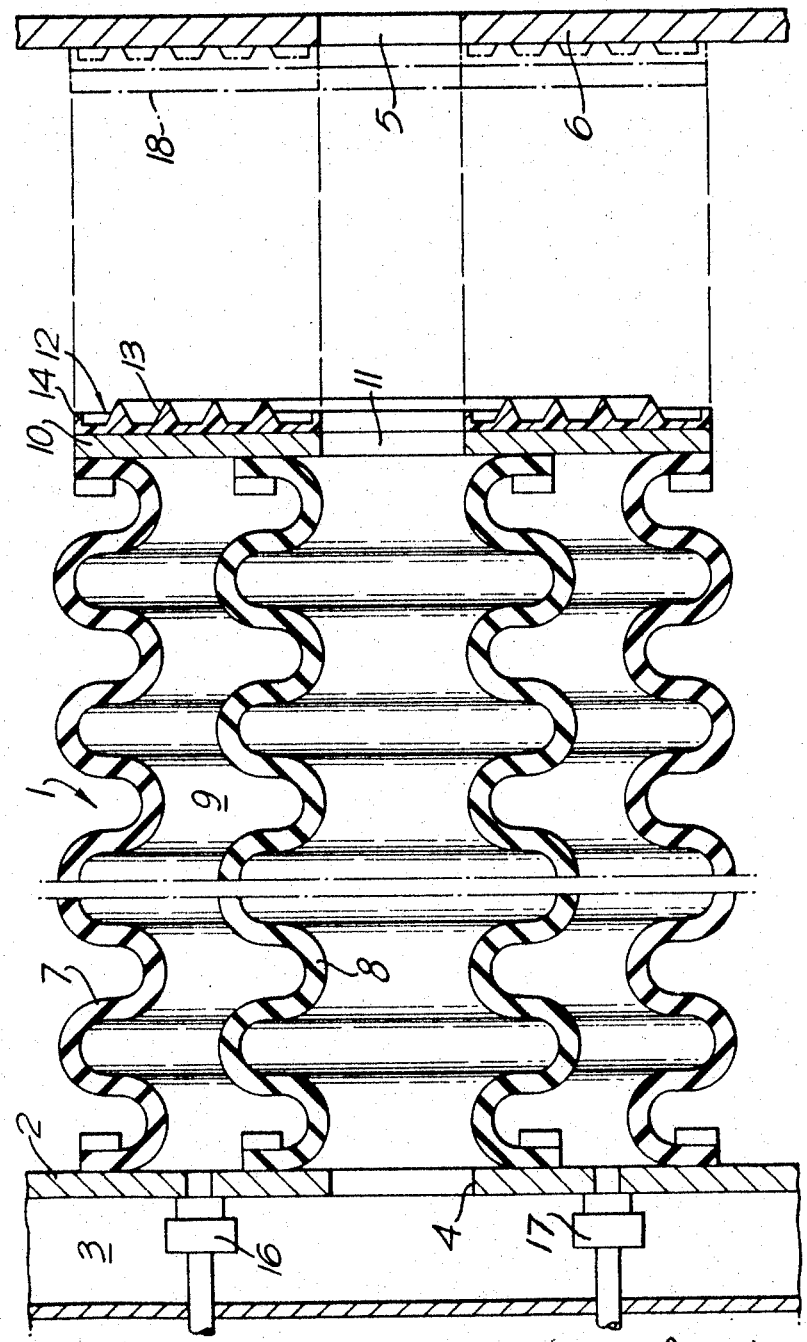

3,463,516
FLEXIBLE COUPLINGS FOR PROVIDING FLUID COMMUNICATION BETWEEN TWO MEMBERS
Rupert Munton, Croydon, England, assignor to Shipowners Refrigerated Cargo Research Association, London, England, a corporation of the United Kingdom
Filed Sept. 5, 1967, Ser. No. 665,496
Claims priority, application Great Britain, Sept. 16, 1966, 41,445/66
Int. Cl. F16l 25/00, 55/00
U.S. Cl. 285—9                                    5 Claims

ABSTRACT OF THE DISCLOSURE

A coupling for providing fluid communication between two members, and particularly between a refrigerated container and a permanent refrigeration system in the hold of a ship, which coupling is flexible and extendable, and is insulated. The coupling is adapted to be permanently secured at one end to ducting of the refrigeration system, and adapted to be moved into and out of engagement with a wall of a container, the free end of the coupling being provided with an abutment seal which is adapted to engage around an aperture in said wall.

---

This invention relates to couplings, and in its broadest aspect, to flexible couplings for providing fluid communication between two members, such as between two conduits, a conduit and a container, or two containers.

More particularly, the invention relates to flexible couplings for connecting transportable containers with a supply of fluid, either under pressure or at low pressure. This invention is especially applicable to refrigeration systems, especially permanent refrigeration systems, such as might be fitted in a refrigerated cargo ship or in a warehouse or, for that matter, in a vehicle or an aeroplane. The invention, however, is also applicable to connection devices for the transfer of fluids, other than air, and fluidised solids, for example, for the filling or emptying of a transportable container.

An object of this invention is to provide a coupling especially suited for connecting the interior of a transportable container with means providing a supply of heat transferring fluid, the coupling being so constructed as to facilitate the coupling operation and, when coupled, to accommodate limited relative movement in every plane between the container and the means providing the supply of heat transferring fluid.

Another object of the invention is to provide a coupling of the character referred to including a double bellows coupling body through the inner bellows of which the heat transferring fluid is passed, the two bellows being radially spaced from each other so as to insulate the inner bellows against transfer of heat through the body.

A further object of the invention is to provide such a coupling arrangement in connection with means for supplying the space between the inner and outer bellows with fluid under pressure, separate from the heat transferring fluid, for extending the coupling body to cause engagement of a sealing means carried thereby with the container.

Other objects of the invention will become apparent from a reading of the following more detailed description, the appended claims, and the accompanying drawing.

According to the invention, a coupling for providing fluid communication between two members comprises a flexible extendible tubular body adapted to be sealed at one end around an aperture in one of said members and adapted to be coupled at its other end around an aperture provided in the other member and sealing means on said other end and adapted to engage with the other member to form a seal therewith.

More particularly, the coupling is for connecting the interior of a transportable container with a supply of fluid under pressure, and the said one end is adapted to be sealed around a first aperture leading to the supply fluid, and the other end is adapted to be connected around a second aperture provided in the continer so as to define a fluid passage from the first aperture to the interior of the container, sealing means being provided on the container-engaging end of the coupling and being adapted to engage with the container around the second aperture to form a seal. Means are provided to move the coupling into and out of sealing engagement with the container.

Referring to the application of the invention to refrigeration systems, it has been the practice in the past when moving cargoes in portable refrigerated containers, for example, in a ship from one country to another or in a vehicle or aeroplane, to provide each container with its own refrigerator unit. This has disadvantages since, if the refrigerator unit is a portable one which can be attached to the outside of the container, the unit takes up a large amount of space and is susceptible to damage, and if it forms part of the container, it makes the container very expensive.

According to a special aspect of the invention therefore, the coupling is for connecting the interior of a portable refrigerated container with a refrigeration system, and the body is made of insulating material and the said one end is adapted to be sealed around an aperture formed in a fixed bulkhead forming part of the refrigeration system, so as to defined an insulated air passage from the aperture in the bulkhead to the interior of the container.

The coupling body is in the form of a bellows of double wall construction, the internal wall being spaced from and approximately coaxial with the external wall. To give extra strength to the bellows, reinforcement rings may be provided thereabout.

In the preferred embodiment, an annular end plate is provided at the container-engaging end of the bellows, and the sealing means is attached to one, e.g., the outer face of the end plate and the bellows are attached adjacent the inner and outer peripheries respectively of the other or inner face of the end plate.

To move the coupling into sealing engagement with the aperture in the container, it is only necessary substantially correctly to position the aperture in the container with respect to the coupling and then to cause the coupling to be extended, and the sealing means will move into engagement with the container so that the seal surrounds the opening. The sealing means may be made of rubber or plastics material and may be provided on its outer surface, with a stop ring or rings around its periphery and with plurality of concentric projections, which may be of triangular cross-section, internally of the stop ring, which projections are arranged to be deformed when the sealing means is brought into sealing engagement with the container.

In order to enable the coupling to be extended, diametrically opposed openings are provided in the fixed bulkhead to form a compressed air inlet and a compressed air outlet, the arrangement being such that the two openings register with the space defined by the internal and external walls of the bellows, so that upon application of compressed air to the inlet, the said space is pressurised, thereby causing the coupling to be extended into sealing engagement with the container.

Preferably, the other end of the coupling is adapted to be secured directly around the aperture leading from the permanent refrigeration system, although it would be possible to fit an end plate to this end, which could then be connected to the refrigeration system.

Two identical couplings are provided for each container, one forming a cold air inlet and the other forming an outlet, thereby enabling cold air to be circulated through the container.

Preferably means are included for retaining the coupling in its retracted position.

Means may also be provided for de-icing the couplings when used in connection with refrigerated containers.

An embodiment of the invention will now be described with reference to the accompanying diagrammatic drawing which is a sectional plan view of a coupling in a withdrawn inoperative position, its operative extended position being shown in broken lines.

Referring to the drawings, the coupling, generally indicated at 1, is arranged to form a flexible connection between a permanent refrigeration system provided for example, in the hold of a ship or in a warehouse, and a portable container in the hold or the warehouse. A fixed bulkhead 2, forming part of a delivery duct 3 of a circulatory refrigeration system, is provided with an aperture 4 which is connected by means of the coupling 1 around an aperture 5 provided in a bulkhead 6 of the container (not shown in full).

The coupling 1 comprises a body of double wall bellows construction including an external wall 7 and an internal wall 8 concentric with and spaced from the external wall 7, so as to define a substantially annular space 9 therebetween. The two walls 7 and 8 are each sealed at one end to the bulkhead 2 in known manner so that the passage defined by the internal wall 8 is in sealed communication with the aperture 4. The other end of the wall 7 is connected in a similar manner to the outer periphery of the inner face of an annular end plate 10, and the other end of the wall 8 is similarly connected to the inner periphery of the said face of the plate 10, so that the aperture 11 in the end plate is also in communication with the passage defined by the internal wall 8. Sealing means 12 is connected to the outer face of the end plate 10. In the preferred form, the sealing means 12 is of the same annular outline as the end plate 10 and is formed of rubber, plastics or other suitable resilient sealing material. The annular sealing means 12 is secured to the outer face of the end plate 10, for example, by means of an adhesive, and its outer surface is formed with a plurality of deformable, concentric projections 13 of triangular cross section, and around its periphery, with a stop ring ( or rings) 14.

A compressed air inlet 16 passes through the fixed bulkhead 2 and is in communication with the space 9 and a compressed air outlet 17, similar to the inlet 16, is arranged diametrically opposite the inlet 16 to communicate with the space 9. The coupling is shown in full lines in its withdrawn position, and when it is required to be extended into sealing engagement with the bulkhead 6 of the container (which position is shown by chain lines 18) compressed air is supplied to the space 9 through the inlet 16, the outlet 17 being closed. This compressed air builds up a pressure within the space 9 thereby causing the walls 7 and 8 to extend. Should the aperture 5 in the container bulkhead 6 not be in true alignment with the aperture 11 provided in the end plate 10, it is possible, due to the flexibility of the bellows, to flex the coupling into correct alignment with the aperture 5. In this manner, the sealing means 12 can be brought into direct sealing engagement with the flat sealing surface on the container bulkhead 6, around the aperture 5 therein. It may be kept in sealing engagement therewith either by the compressed air in the space 9, or alternatively, a suitable latching device (not shown) may be provided.

A good seal is obtained, since as can be seen from the drawing, the sharp edges of the projections 13 will deform when brought against the container bulkhead 6, and flatten out, until the stop ring 14 engages the container bulkhead.

It will be appreciated that in order to obtain a flow of cold air through the container, it will be necessary to provide a second coupling. This second coupling can be identical to the coupling 1 and can be connected to a second bulkhead forming part of the return duct (not shown) of the refrigeration system. Once the two couplings have been connected to the cotainer, a supply of cold air may be pumped into the duct 3, and this will then circulate through the coupling 1, through the apertures 4 and 11, into the container, out of the container and through the other coupling and back into the return duct and to the refrigeration unit.

It will be apparent that when it is required to disconnect the couplings from the container for de-icing, for example, the application of hot air, may be employed to release the seal 12 from the container bulkhead 6 and any latch provided released, and the outlet 17 then opened. The coupling can then be collapsed into its withdrawn position. A simple manually connected tie rod may be used to latch it in its retracted position.

It will be realised that several pairs of couplings may be provided, each pair being for a separate container. All of the pairs of couplings may be connected to the same supply and return ducts permanently fixed in the ship's hold or in the warehouse.

It will also be appreciated that other known types of seals may be provided in place of the sealing means 12.

When the couplings are used in conjunction with containers, the supply air will normally be at a temperature of minus 25° Fahrenheit and a pressure of up to plus 4" w.g. and the return air will be at a temperature usually slightly greater than minus 25° Fahrenheit and a pressure down to minus 4" w.g. A quantity of 12 m.m. of ozone per hour per 1,000 cubic of air will be introduced at bi-monthly intervals, in each case for a period of 24 hours, and the materials used in the coupling must therefore not be adversely affected by this concentration of ozone. Furthermore, the components of the coupling directly in contact with the flow of cold air must not be manufactured from any materials of an odour retentative nature. It is to be noted that the temperature in which the connectors are housed will vary between minus 5° Fahrenheit and 110° Fahrenheit with relative humidity possibly 95%.

In the above described arrangement, the aperture in the container is preferably of 10" diameter, and this is surrounded by a prepared face extending over an 18" diameter. The coupling, when engaged, has to be capable of accepting lateral motion of the container of plus and minus 1". When collapsed, the coupling should retract approximately 3", and springs in tension may be fitted to supplement the resilience of the bellows.

Although the invention has been specifically designed for use with refrigeration systems for the transfer of cold air, it could also be used in many other instances. For example, the couplings can be used for the transportation of fluids between, for example, a conduit and a container or simply for connecting two conduits. Furthermore, due to the nature of the material from which the couplings are made, they can be used for transferring hot fluids as well as cold fluids.

In an alternative construction, the sapce between the two walls of the bellows may be vented to atmosphere, and, instead of compressed air being supplied to the interior of the bellows, the bellows may be moved to their extended operative position by a spring and be withdrawn by a pneumatic piston and cylinder device, thereby ensuring that if the pneumatic device fails, the coupling will not.

What is claimed is:

1. A coupling for connecting the interior of a transportable refrigerated container with a supply of fluid under pressure, said coupling comprising a flexible extendible tubular body made of thermal insulating material, said body being in the form of a bellows of double wall construction, the internal wall thereof being spaced from and approximately coaxial with the external wall thereof, said walls thereby defining an annular space between said walls; connecting means at one end of said body for sealingly connecting said one end of said body around a first aperture leading to said supply of fluid; abutment sealing means at the other end of said body sealingly engaging said body and adapted to be connected in abutting sealing engagement with a flat sealing surface around a second aperture provided in said container; and means provided for inlet of fluid to and outlet of fluid from said annular space, whereby fluid under pressure can be pumped into and out of said space respectively to cause extension and contraction of said flexible extendible tubular body, said body, when extended to bring said abutment sealing means into abutting sealing engagement with said flat sealing surface, providing a fluid passage from said first aperture to the interior of said container through said second aperture and said coupling body, when extended, accommodating limited relative movement in every plane between said container and said first aperture, said body, connecting means, abutment sealing means and fluid inlet and outlet means all being so constructed and arraged that the fluid within said annular space and the fluid transported through the coupling do not intermix.

2. A coupling according to claim 1 in which said walls are made of rubber.

3. A coupling according to claim 1 in which said walls are made of plastics material.

4. A coupling according to claim 1 including a substantially flat annular end plate at one end of said body and means connecting said body in sealing engagement with said end plate.

5. A coupling according to claim 4 in which said sealing means include at least one stop ring on the outer surface of said end plate around its periphery, and a plurality of concentric deformable projections of triangular cross section, concentrically internally of the stop ring, which projections are deformed when the sealing means is brought into said abutting engagement with said flat sealing surface.

References Cited

UNITED STATES PATENTS

| 2,128,217 | 8/1938 | Anderson | 285—9 X |
| 2,272,890 | 2/1942 | Bosomworth | 285—226 X |
| 2,641,486 | 6/1953 | Vance | 285—226 X |
| 3,195,930 | 7/1965 | Ascherl et al. | 285—101 X |
| 3,298,680 | 1/1967 | Jablin | 285—9 X |
| 3,330,303 | 7/1967 | Fochler | 285—226 X |

FOREIGN PATENTS

| 1,140,522 | 3/1957 | France. |
| 258,088 | 11/1948 | Switzerland. |

DAVID J. WILLIAMOWSKY, Primary Examiner

D. W. AROLA, Assistant Examiner

U.S. Cl. X.R.

285—158, 227, 328, 379, 423